Aug. 20, 1968    SABURO SAKAMOTO    3,398,271
BATTERY HOLDING ARRANGEMENT FOR A LAMP
Filed Dec. 7, 1966    3 Sheets-Sheet 2
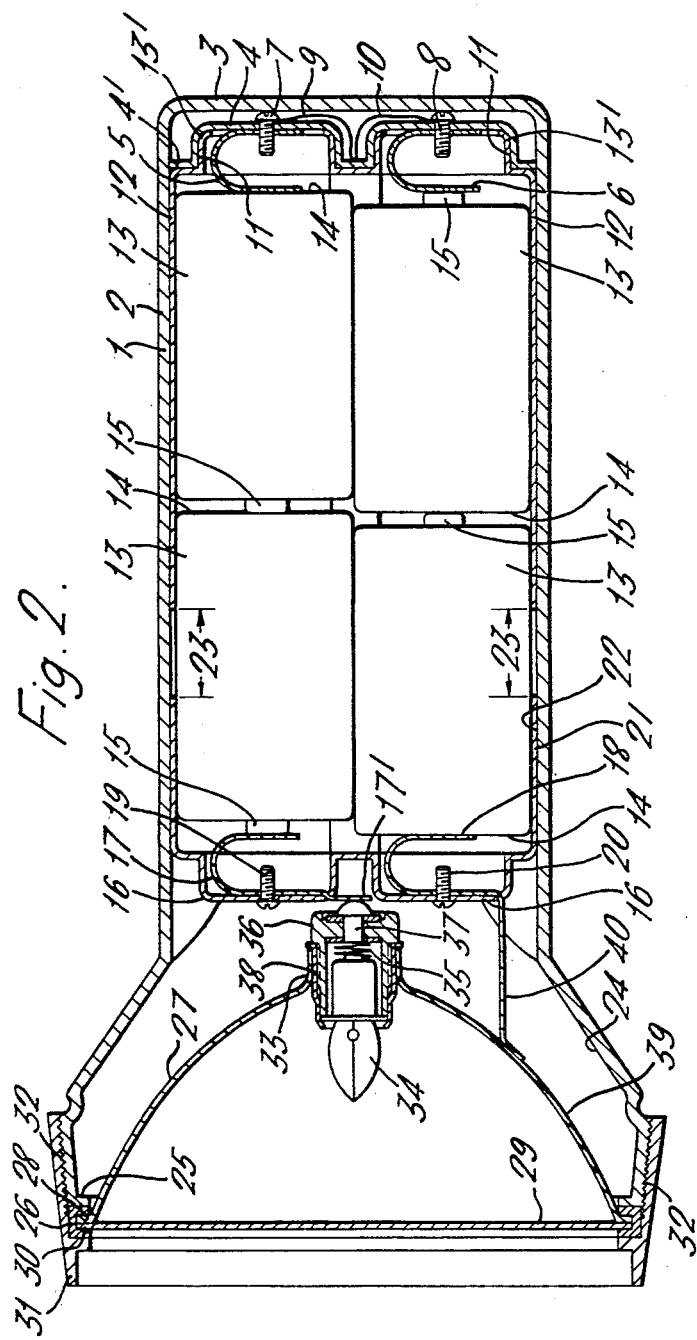
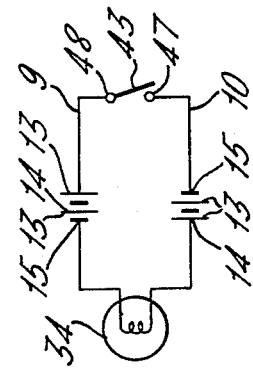
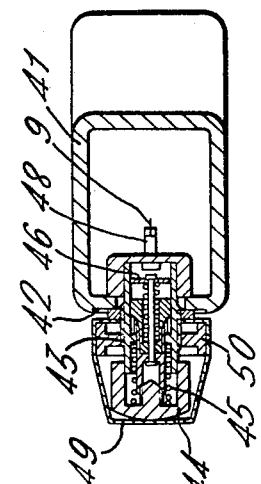
INVENTOR
Saburo Sakamoto
BY
Michael S. Striker
ATTORNEY

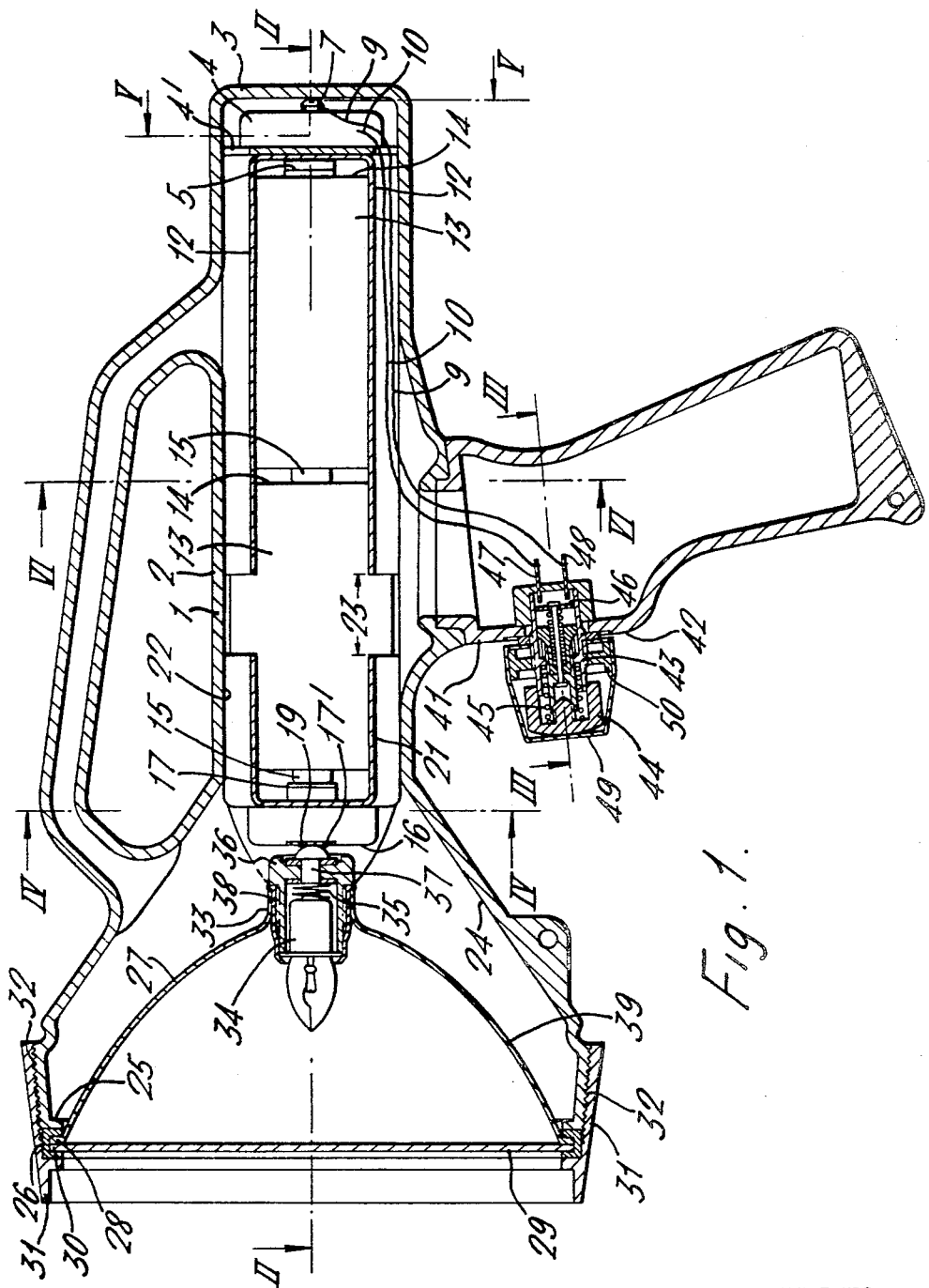

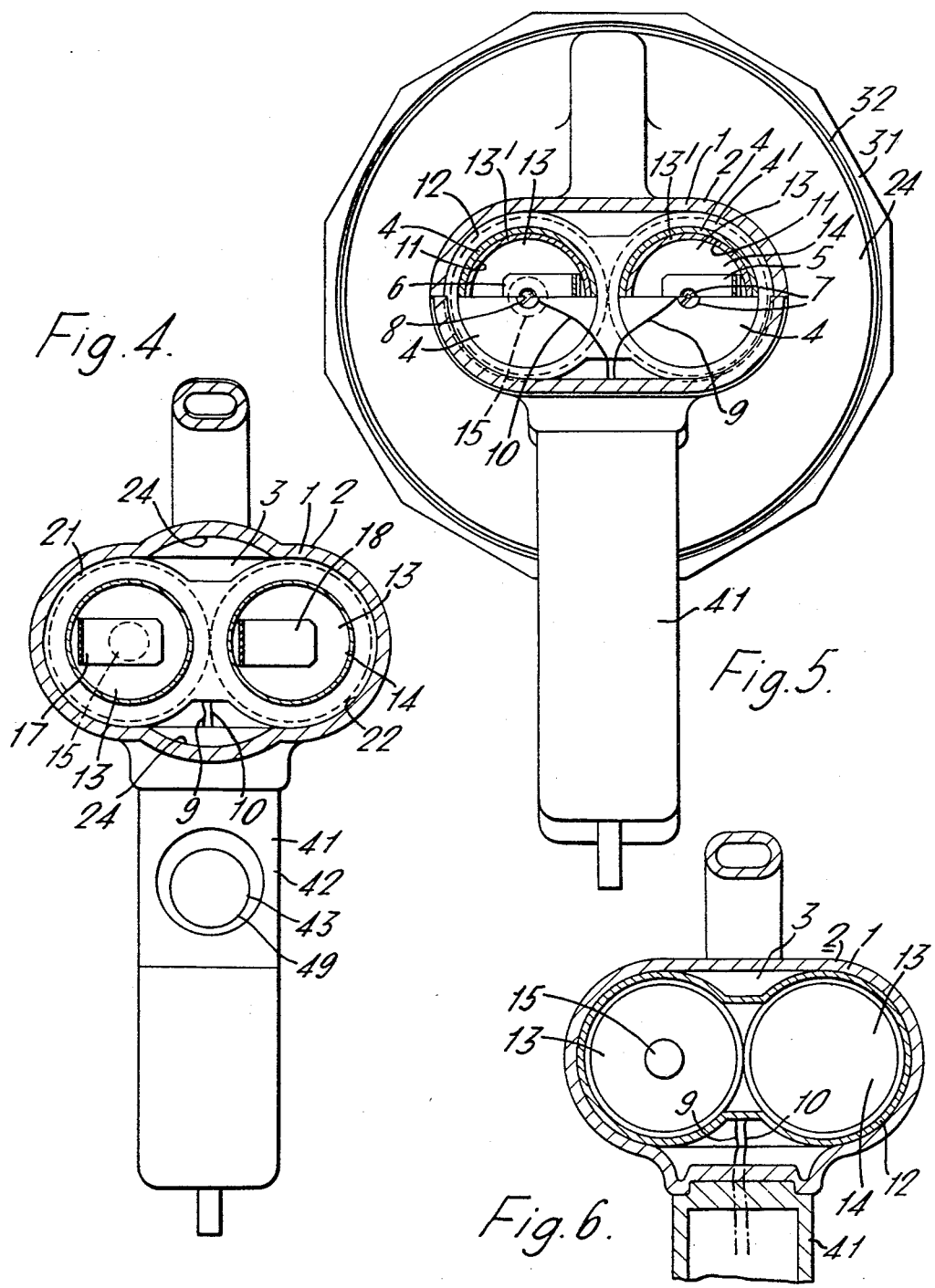

United States Patent Office 3,398,271
Patented Aug. 20, 1968

3,398,271
BATTERY HOLDING ARRANGEMENT
FOR A LAMP
Saburo Sakamoto, 37 3-chome Higashi-Shinagawa,
Shinagawa-ku, Tokyo, Japan
Filed Dec. 7, 1966, Ser. No. 599,765
Claims priority, application Japan, Apr. 30, 1966,
41/27,135
4 Claims. (Cl. 240—10.63)

ABSTRACT OF THE DISCLOSURE

A waterproof flashlight having an inner housing closely fitted within an outer-casing. Spring contacts engage batteries to provide a tight electrical connection in order to prevent movement of the batteries within the casing.

---

The present invention relates to a battery holding arrangement for a lamp, and more particularly to a waterproof dry battery lamp assembly wherein the components thereof are tightly contained therein and cannot be unintentionally loosened.

In conventional flashlights, batteries are haphazardly positioned within the casing. Therefore, it has been necessary to provide a complicated clamping structure in order to prevent the loosening or movement of the batteries within the casing.

It is, therefore, an object of the invention to provide a waterproof battery lamp including a battery housing structure which will hold the battery, or batteries against transverse movement within the lamp and against longitudinal movement therein.

It is another object to position the batteries advantageously with respect to the lamp casing and with respect to each other.

It is a further object of the invention to provide a longitudinal space within the lamp casing in which the electric conductors may be advantageously disposed.

Finally, it is an object of the invention to employ leaf spring terminals within the battery housing to hold the batteries resiliently against axial movement therein.

An important feature of this invention resides in the provision of an inner housing. This housing provides a ready means for positioning the batteries in the lamp casing as well as for holding them in proper relationship to one another. At the same time, the housing fits tightly between the outer casing and the batteries, and it is of such shape as to restrain movement of the batteries, thereby providing the feature that the batteries are prevented from loosening.

According to the invention, the waterproof lamp includes in combination, a battery holding arrangement comprising an outer waterproof casing, an inner housing means fitted into the outer casing and adapted to envelop the batteries of the lamp, and means for holding the inner housing means in the outer casing.

In a preferred embodiment of the invention, there is included a contact spring means having a first part located within the housing means for engaging the batteries and a second part located outside of the housing means and adapted to establish electrical connections with a light bulb.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal vertical sectional view of a waterproof dry battery lamp according to the invention;

FIGS. 2, 3, 4, 5 and 6 are sectional views taken along the lines II—II, III—III, IV—IV, V—V and VI—VI, respectively, of FIG. 1; and FIG. 7 is a circuit diagram of electric wiring.

The lamp shown in FIGS. 1 to 6 has an outer waterproof casing 1 made of acrylic resin, vinyl resin or the like, and comprises a dry battery receiving shell 2 of generally elliptical cross-section having a bottom end plate 3. A dry battery enveloping inner housing means of generally short-necked dumbbell cross-section, later to be described, is fitted within the casing 1.

A terminal attaching member 4 of short-necked dumbbell cross-section is tightly fitted within the shell 2 in close proximity to the inner surface of said bottom end plate 3 with a flange portion 4' thereat bearing against the inner surface of the casing. Leaf spring terminals 5 and 6 are attached to the member 4 by means of screws 7 and 8, respectively, to the outer ends of which conductors 9 and 10 are connected.

A first battery housing 12, here shown as of short-necked dumbbell cross-section, having a bottom or end supporting portion 13', which is of reduced short-necked dumbbell cross-section, is tightly fitted within the bottom or inner end portion of the battery receiving shell 2, with said portion 13' tightly bearing against the inner side 11 of said terminal attaching member 4. The end supporting portion 13' has openings therein through which the leaf spring terminals 5 and 6 may project when attached to the terminal attaching member 4. Within the first battery housing 12, here shown, dry element batteries 13 are tightly fitted against each other in two rows so that terminals 14 and 15 at the ends thereof may bear against said leaf spring terminals 5 and 6. Furthermore, the battery housing may be removed from the casing 1 while leaving the terminal attaching member 4 with the leaf spring terminals 5 and 6 attached thereto within the casing.

With the battery housing containing the batteries in the casing as described, then, a battery push-in or second housing 21 of like short-necked dumbbell cross-section, which has at its outer end a top or outer plate 16 and two leaf spring terminals 17 and 18 attached to said plate by means of their respective screws 19 and 20, is tight-fitted into the open end portion 22 of the battery receiving shell 2 of the casing 1. Thus the dry batteries 13 may be tightly received within the opening and at the same time the leaf spring terminals 17 and 18 may bear against the associated terminals 15 and 14 of each dry battery 13. In this connection, it should be noted that a clamping gap 23 is left between the rim edges of the first and second battery housings 12 and 21.

A trumpet-shaped flared tube 24 is integrally connected to said open end portion 22 of the casing 1 and has an inturned flange 25 at its outer end. A reflector 27 and a transparent light transmission plate 29 made of glass, acrylic resin or the like are held in position, with the rim 28 of said reflector and the peripheral edge 30 of said plate being sealed by a waterproof rubber packing ring 26 and clamped against the flange 25 by means of an annular clamping member 31 and engaging threads 32 on an outer end of the tube 24 and the inner end of the annular clamping member 31.

The reflector 27 has a bottom cylindircal portion 33, and an electric bulb 34 is mounted in said bottom portion 33 by means of a spring 35, support tube 36, terminal 37 and retaining tube 38 having an inwardly turned outer rim. Thus a leaf spring connector 40 connected to said leaf spring terminal 18 may be resiliently in contact with the convex face 39 of said reflector, and the terminal 37 may be electrically connected to the projecting end 17' of the leaf spring terminal 17 by contact therewith.

Accordingly, the dry element batteries, reflector, electric bulb and their associated equipments are housed within the casing 1 in a completely watertight manner, and seal-fitted therein without play and loosening.

Further, a watertight synthetic resin grip handle 41 is provided on the underside of the casing 1 and projects downwardly therefrom; and a switch 43 is attached to the front side 42 of said handle. This switch includes a pusher 44, spring 45, contact plate 46, and terminals 47 and 48 contractable by the plate 46 upon movement thereof toward said terminals. The wires 9 and 10 are connected to said terminals 47 and 48. The switch assembly is sealed by a rubber waterproof cover 49 and sealedly fastened to the grip handle 41 by a fastening screw 50. The switch 43 can be easily operated by depressing it from outside of said cover 49 to bridge the contacts 47 and 48.

While the invention has been illustrated and described as embodied in a waterproof dry battery lamp, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a waterproof lamp, in combination: a battery holding arrangement comprising an outer waterproof casing; inner housing means fitted into said outer casing and adapted to envelop batteries; holding means for holding said inner housing means in said outer casing and including contact spring means having a first part located within said housing means for engaging said batteries and a second part located outside of said housing means and adapted to establish electrical connections with a light bulb, said inner housing means including a first battery housing and a coaxial axially separated second battery housing fitted into said casing to hold a dry battery against transverse movement within said casing, and wherein said contact spring means are leaf spring terminals and including one leaf spring terminal at the outer end of said second housing for making electrical contact with and bearing resiliently against a pole of one polarity of one of the batteries and projecting out of said housing to make electrical connection with one terminal of the bulb, and also including second leaf spring terminal at the outer end of said second housing for making contact with and bearing resiliently against a pole of opposite polarity of the other battery and projecting out of said housing to make electrical connection with the other terminal of said bulb.

2. An arrangement as defined in claim 1, including a leaf spring terminal at the outer end of said first battery housing making electrical contact with a pole of one polarity of one of said batteries, a second leaf spring terminal at the outer end of said first battery housing for making electrical contact with a pole of opposite polarity of the other battery, and also including electrical conductors disposed in the space between said battery housing and said casing.

3. An arrangement as defined in claim 2, including a separate terminal attaching member inserted between the outer end of said battery housing and the inner end of said casing, said attaching member having internally threaded openings therethrough to receive the shanks of conductor clamping screws.

4. An arrangement as defined in claim 3, including an end supporting portion at the outer end of said battery housing having openings therein through which said leaf spring terminals may project from said separate terminal attaching member.

References Cited

UNITED STATES PATENTS

| 1,849,136 | 3/1932 | Currie | 240—10.63 X |
| 1,872,840 | 8/1932 | Stevenson | 240—10.65 |
| 2,597,565 | 5/1952 | Chandler et al. | 240—10.66 X |
| 3,124,306 | 3/1964 | Schotz | 240—10.63 |
| 3,323,118 | 5/1967 | Chan | 240—10.63 X |

NORTON ANSHER, *Primary Examiner.*

CHARLES E. SMITH, *Assistant Examiner.*